United States Patent
Naitou et al.

(10) Patent No.: US 10,308,273 B2
(45) Date of Patent: Jun. 4, 2019

(54) STEERING WHEEL HEATER AND STEERING WHEEL

(71) Applicant: Panasonic Intellectual Property Management Co., Ltd., Osaka (JP)

(72) Inventors: Hiroshi Naitou, Osaka (JP); Shinji Fujikawa, Osaka (JP); Tsuyoshi Nishio, Chiba (JP); Nobuharu Katsuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 881 days.

(21) Appl. No.: 14/889,314

(22) PCT Filed: Sep. 18, 2014

(86) PCT No.: PCT/JP2014/004808
§ 371 (c)(1),
(2) Date: Nov. 5, 2015

(87) PCT Pub. No.: WO2015/040864
PCT Pub. Date: Mar. 26, 2015

(65) Prior Publication Data
US 2016/0096543 A1    Apr. 7, 2016

(30) Foreign Application Priority Data

Sep. 19, 2013 (JP) .................................. 2013-194547

(51) Int. Cl.
*H05B 1/02* (2006.01)
*B62D 1/06* (2006.01)
(Continued)

(52) U.S. Cl.
CPC ................ *B62D 1/065* (2013.01); *B60L 1/02* (2013.01); *H05B 3/34* (2013.01); *H05B 2203/014* (2013.01)

(58) Field of Classification Search
CPC .. B65D 1/025; B65C 1/02; H05B 3/34; H05B 3/0042; H05B 1/0236; H05B 2203/014
(Continued)

(56) References Cited

U.S. PATENT DOCUMENTS 5,324,112 A    6/1994  Palazzetti et al.
7,109,862 B2 *  9/2006  Braeuchle ................ B62D 1/06
                                                340/561
(Continued)

FOREIGN PATENT DOCUMENTS

EP    2572942 A1    3/2013
JP    58-209882     12/1983
(Continued)

OTHER PUBLICATIONS

The Extended European Search Report dated Aug. 16, 2016 for the related European Patent Application No. 14846268.2.
(Continued)

*Primary Examiner* — Mark H Paschall
(74) *Attorney, Agent, or Firm* — Greenblum & Berstein, P.L.C.

(57) ABSTRACT

A steering wheel heater device including: a heating wire; a power line connected in series to the heating wire, for supplying the heating wire with power; a ground line connected in series to the heating wire; a lead-out wire connected to a point along a wiring pattern formed of the heating wire; and a contact detection circuit electrically connected to the wiring pattern formed of the heating wire
(Continued)

through the lead-out wire, wherein a portion of the wiring pattern is connected in series between the ground line and the contact detection circuit.

9 Claims, 17 Drawing Sheets

(51) Int. Cl.
*H05B 3/34* (2006.01)
*B60L 1/02* (2006.01)

(58) Field of Classification Search
USPC .................. 219/494, 497, 202, 203, 507
See application file for complete search history.

(56) References Cited

U.S. PATENT DOCUMENTS

| | | | | |
|---|---|---|---|---|
| 9,346,480 | B2* | 5/2016 | Maguire | B62D 1/046 |
| 9,701,232 | B2* | 7/2017 | Barfuss | B62D 1/046 |
| 9,815,488 | B2* | 11/2017 | Lofy | B62D 1/065 |
| 10,124,823 | B2* | 11/2018 | Van'tZelfde | H05K 9/0071 |
| 2002/0170900 | A1* | 11/2002 | Braeuchle | B62D 1/06 |
| | | | | 219/204 |
| 2008/0017625 | A1 | 1/2008 | Ito et al. | |
| 2013/0092677 | A1* | 4/2013 | Virnich | B60N 2/5685 |
| | | | | 219/204 |
| 2013/0098890 | A1* | 4/2013 | Virnich | B60N 2/5685 |
| | | | | 219/204 |
| 2013/0127211 | A1 | 5/2013 | Aoki | |

FOREIGN PATENT DOCUMENTS

| | | |
|---|---|---|
| JP | 3-008893 U | 1/1991 |
| JP | 6-099722 | 4/1994 |
| JP | 10-062268 | 3/1998 |
| JP | 2002-340712 | 11/2002 |
| JP | 2008-024087 | 2/2008 |
| JP | 2010-215140 | 9/2010 |
| JP | 2012-035715 | 2/2012 |

OTHER PUBLICATIONS

International Search Report of PCT application No. PCT/JP2014/004808 dated Dec. 22, 2014.

* cited by examiner

STEERING WHEEL HEATER AND STEERING WHEEL

CROSS-REFERENCE TO RELATED APPLICATIONS

This application is a U.S. national stage application of the PCT International Application No. PCT/JP2014/004808 filed on Sep. 18, 2014, which claims the benefit of foreign priority of Japanese patent application 2013-194547 filed on Sep. 19, 2013, the contents all of which are incorporated herein by reference.

TECHNICAL FIELD

The present disclosure relates to a steering wheel, and a steering wheel heater and a steering wheel heater device to be included in the steering wheel.

BACKGROUND ART

Patent Literature (PTL) 1 discloses a detection device which detects whether a human hand is in contact with a steering wheel, taking advantage of characteristics of an oscillator circuit in that the frequency of the oscillator circuit changes as capacitance changes.

Meanwhile, PTL 2 discloses a vehicle seat apparatus which makes use of a seat heater to detect whether a passenger is being seated. The vehicle seat apparatus serves as a seat heater and also as an electrode for detecting whether the passenger is being seated. Thus, an oscillator circuit is obviated, and cost is reduced.

FIG. 17 is a block diagram of the vehicle seat apparatus disclosed in PTL 2.

Seat heater 8 is provided in a seat of vehicle seat apparatus 1, and connected via coupling capacitor 22 to seating detection circuit 14. Seat heater 8 is supplied with power via seat-heater release switches 11 and 12. Seating detection circuit 14 detects passenger's action of seating himself/herself on vehicle seat apparatus 1, when seat-heater release switches 11 and 12 are off.

FIG. 18 is a diagram showing an equivalent circuit at a time when the vehicle seat apparatus shown in FIG. 17 detects whether the passenger is being seated.

Seating detection circuit 14 is connected via coupling capacitor 22 to seat heater 8, parasitic capacitance C11 and C12, and capacitance C13, as shown in the figure. Herein, parasitic capacitance C11 and C12 represent parasitic capacitance generated by seat-heater release switches 11 and 12, respectively, when seat-heater release switch 11 and seat-heater release switch 12 are off. Capacitance C13 has one electrode corresponding to seat heater 8 and the other electrode corresponding to a human body.

Capacitance C13 when a person is being seated on vehicle seat apparatus 1 is greater than when the person is not seated on vehicle seat apparatus 1. Seating detection circuit 14 detects whether the person is being seated, based on the magnitude of capacitance C13.

Typically, seat-heater release switches 11 and 12 are placed into a conductive state (on) to warm the heater, and placed into a blocked state (off) to operate seating detection circuit 14.

CITATION LIST

Patent Literature

PTL 1: Unexamined Japanese Patent Publication No. 2002-340712

PTL 2: Unexamined Japanese Patent Publication No. 2008-24087

SUMMARY OF THE INVENTION

The inventors considered applying the technique of making use of the seat heater also as a circuit for detecting whether contact is made with a human body in the aforementioned conventional technique (FIG. 17) to a steering wheel heater provided in a steering wheel. This, however, decreases the sensitivity of the circuit because the contact area of a human hand with the steering wheel is smaller than the contact area of a human body being seated on the seat heater.

In the configuration shown in FIG. 18, parasitic capacitance C12 of seat-heater release switch 12 and capacitance C13 which varies as a human body approaches are connected in parallel. In doing so, changes in amount of capacitance depending on whether a person is being seated, when seen from seating detection circuit 14, is substantially reduced, and is believed to affect the sensitivity of the circuit. Application of the conventional technique as is to a steering wheel heater causes problem with the sensitivity of a detection circuit (a poor S/N ratio) because a ratio of capacitance C13 to parasitic capacitance C12 is even smaller (e.g., about 10-fold to about 100-fold smaller than parasitic capacitance C12).

The present disclosure is made to address problems as mentioned above, and has an object to provide a steering wheel heater and a steering wheel heater device which have good sensitivity for contact determination with a steering wheel.

To solve the above problems, a steering wheel heater according to the present disclosure is a steering wheel heater including: a heating wire; a first connecting member connected to a first end of the heating wire, the first connecting member being externally connected; a second connecting member connected to a second end of the heating wire, the second connecting member being externally connected; a lead-out wire connected to a portion between the first end and the second end which is a point along a wiring pattern formed of the heating wire; a third connecting member connected to the lead-out wire, the third connecting member being externally connected, wherein the first connecting member or the second connecting member is connected to an external power line through which a direct-current passes, the third connecting member being connected to an external signal line.

According to the above configuration, the heating wire is supplied with the power from the external power line and the external ground line (hereinafter, abbreviated as a "GND line") via the first and second connecting members that have large current capacities, and changes in capacitance caused by approach of a human hand to the steering wheel can be detected by an external contact detection circuit through the lead-out wire and the third connecting member. At this time, a portion of the wiring pattern formed of the heating wire is disposed between the first end of the heating wire connected to the external power line and the second end of the heating wire connected to the external GND line. The wiring pattern formed of the heating wire should have inductance components.

In other words, the steering wheel heater according to the above configuration allows the changes in capacitance generated between the human hand and the wiring pattern to be detected by the contact detection circuit, while reducing or eliminating effects of parasitic capacitance of the switches disposed along the external power line and the external GND line. This also prevents the GND and the contact detection circuit from being directly coupled together even when the switches are not included on the power line and the GND line.

Moreover, the steering wheel heater device according to the present disclosure includes a heating wire; a power line connected in series to the heating wire, for supplying the heating wire with power; a ground line connected in series to the heating wire; a lead-out wire connected to a point along a wiring pattern formed of the heating wire; and a contact detection circuit electrically connected to the wiring pattern through the lead-out wire, wherein a portion of the wiring pattern formed of the heating wire is connected in series between the ground line and the contact detection circuit.

According to the above configuration, a portion of the wiring pattern formed of the heating wire is disposed between the GND line and the contact detection circuit. The wiring pattern disposed therebetween has inductance components, and thus preventing the GND and the contact detection circuit from being directly coupled together. Even if a switch for turning on and off the supply of power to the heating wire is disposed connected to the GND line, the portion of the wiring pattern formed of the heating wire is disposed between the contact detection circuit and the switch. In other words, this can reduce or eliminate the effects of the parasitic capacitance of the switch being off on the capacitance generated between the wiring pattern formed of the heating wire and the human hand. This, in its turn, can provide a steering wheel heater device which has good sensitivity for the contact detection even if the steering wheel heater doubles as a device for detecting contact of the human hand with the steering wheel.

The steering wheel heater and the steering wheel heater device, and the steering wheel including the steering wheel heater and the steering wheel heater device according to the present disclosure can improve sensitivity for detecting whether a human hand is in contact with the steering wheel.

DESCRIPTION OF EMBODIMENTS

Hereinafter, a steering wheel heater and a steering wheel heater device according to the present disclosure will be described, with reference to the accompanying drawings. In the following, detailed description may be omitted. For example, detailed description of well-known matters or description previously set forth with respect to components that are substantially the same may be omitted. This is to avoid unnecessarily redundancy in the description below and for facilitating an understanding by a person skilled in the art.

It should be noted that the accompanying drawings and the description below are provided for a thorough understanding of the present disclosure by a person skilled in the art, and are not intended to be limiting the subject matter recited in any of the claims appended hereto.

Exemplary Embodiment 1

Hereinafter, a steering wheel heater and a steering wheel heater device according to exemplary embodiment 1 are to be described in detail, with reference to FIGS. 1 through 9.

Figure 1:
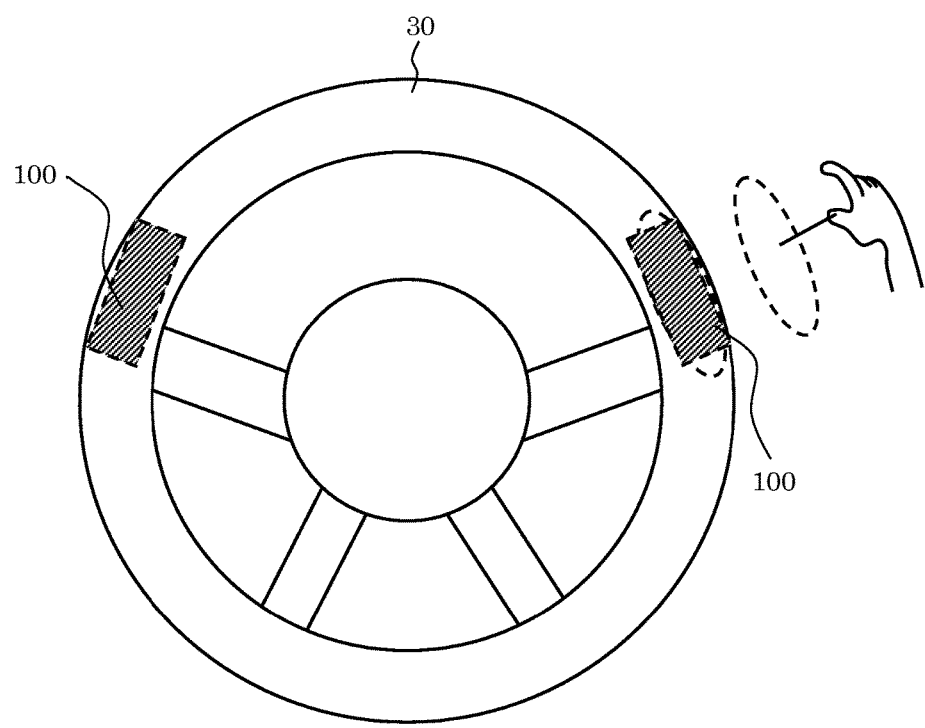
FIG. 1 is a diagram showing an example of a steering wheel which includes steering wheel heater devices according to exemplary embodiment 1.

FIG. 1 is a diagram showing an example of a steering wheel which includes steering wheel heater devices doubling as devices for detecting contact of a human hand, according to exemplary embodiment 1. The steering wheel heater device doubles as a device for detecting contact of a human hand with the steering wheel, and is included in steering wheel 30 of a vehicle, a ship, an aircraft, a spacecraft, or any other means of transportation, for example.

FIG. 1 illustrates steering wheel heater 100 which is a part of the steering wheel heater device. Two of steering wheel heaters 100 are provided for the right and left hands in one steering wheel 30. However, one steering wheel heater 100 or three or more steering wheel heaters 100 may be provided. Also, steering wheel heater 100 may be built in steering wheel 30 or may externally, optionally be attached to the steering wheel.

Figure 2:
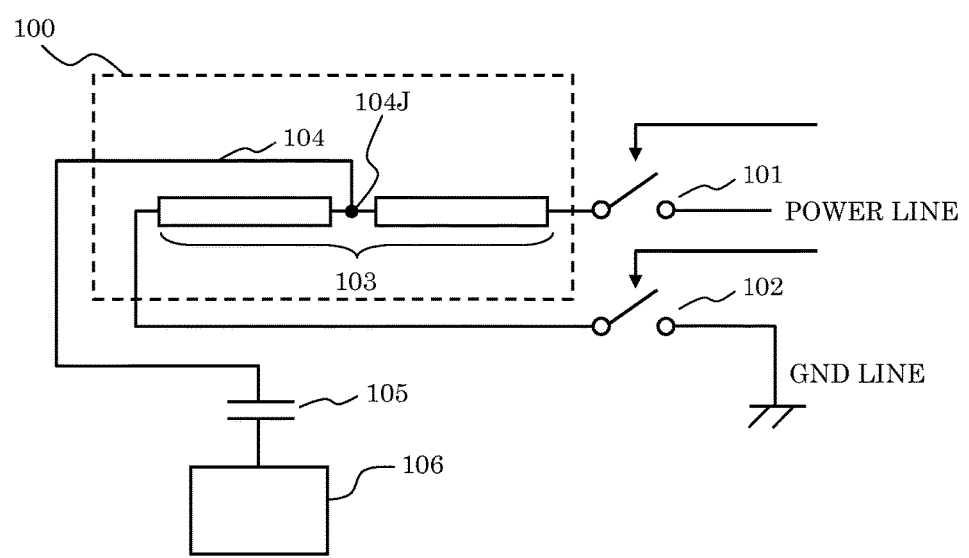
FIG. 2 is a block diagram of a configuration example of the steering wheel heater device according to exemplary embodiment 1.

FIG. 2 is a block diagram of a configuration example of the steering wheel heater device according to the present embodiment. The steering wheel heater device includes switches 101 and 102, heating wire 103, lead-out wire 104, coupling capacitor 105, and contact detection circuit 106. Heating wire 103 and lead-out wire 104 are included in steering wheel heater 100. Switches 101 and 102 are connected in series via heating wire 103, and switch to supply or not to supply power to heating wire 103. Switch 101 is connected to a power line, and switch 102 is connected to a GND line. Switches 101 and 102 are switch transistors. Switches 101 and 102 may be of the same type or may be of different types (e.g., a pMOS transistor and an nMOS transistor).

Steering wheel heater 100 is designed to pass a large current therethrough in order to warm up quickly. On/off control is frequently provided to switch operation between steering wheel heater 100 and contact detection circuit 106, and therefore switches 101 and 102 are generally each configured of a semiconductor device that has small on-resistance Ron. A semiconductor device that has small on-resistance Ron generally has large parasitic capacitance.

Heating wire 103 has one end and the other end electrically connected to switch 101 and switch 102, respectively.

Lead-out wire 104 electrically connects contact detection circuit 106 and a point along a wiring pattern formed of heating wire 103. Specifically, lead-out wire 104 has one end connected to connection point 104J along the heating wire pattern, and the other end connected via coupling capacitor 105 to contact detection circuit 106.

Coupling capacitor 105 is a capacitive element which prevents a direct-current (DC) connection between lead-out wire 104 and contact detection circuit 106 and provides an electrical (alternating-current (AC)) connection between them.

Contact detection circuit 106 determines, when switches 101 102 are off, whether the steering wheel and a human hand are in contact, based on the magnitude of capacitance of the heating wire pattern via lead-out wire 104.

The steering wheel heater device thus configured has a portion of the wiring pattern of heating wire 103 disposed between switch 102 and contact detection circuit 106. This prevents the parasitic capacitance (C2) of switch 102 being off from being electrically direct-coupled to contact detection circuit 106. The portion of the heating wire pattern between switch 102 and contact detection circuit 106 has inductance components and thus can reduce or eliminate effects of the parasitic capacitance (C2) on capacitance (C3) which is generated between heating wire 103 and the human hand. In other words, a steering wheel heater device can be provided which, while serving as a heater and also as a device for detecting contact of a human hand with a steering wheel, has good sensitivity for the contact detection.

Figure 3A:
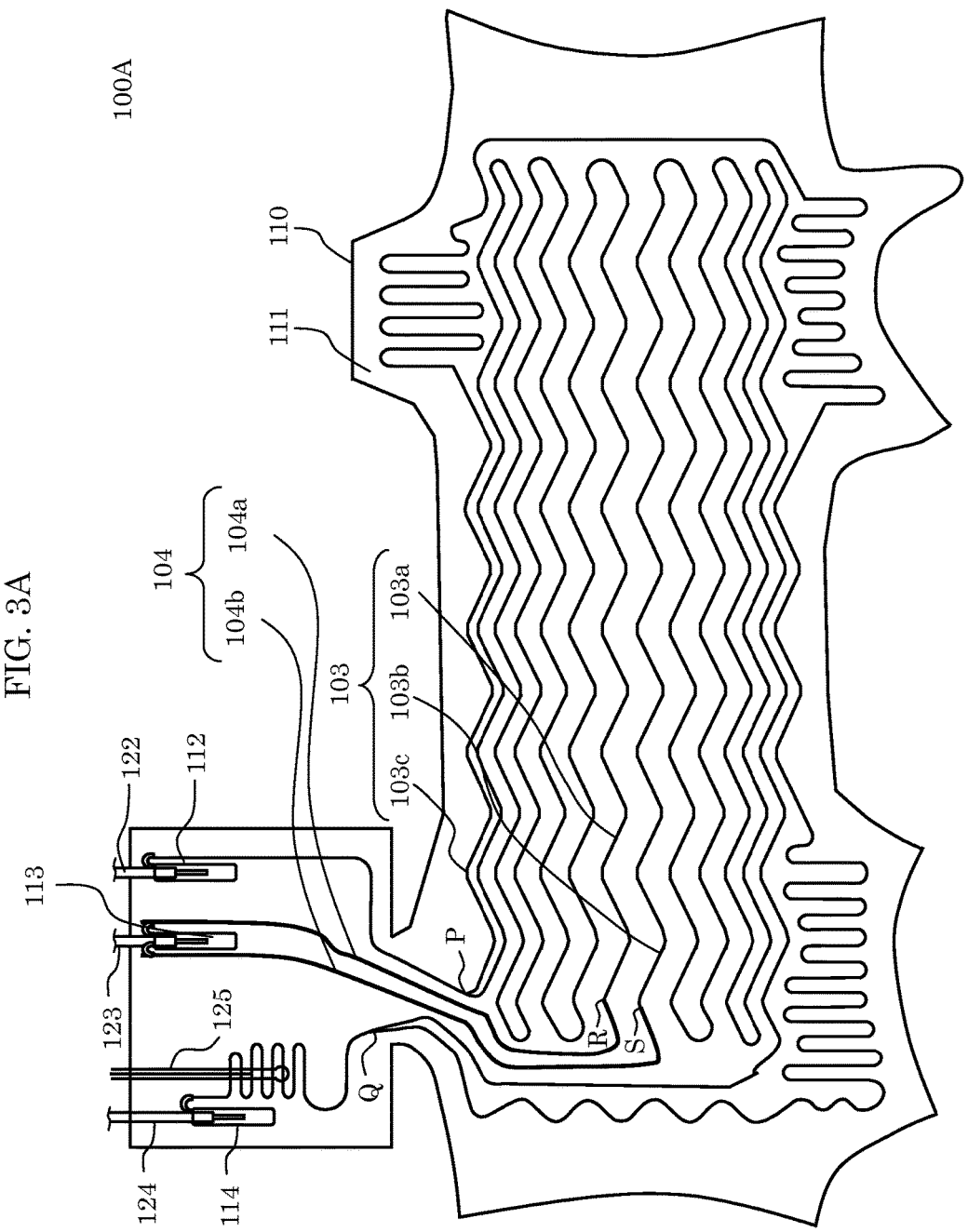
FIG. 3A is a diagram showing an example of a steering wheel heater which includes a heating wire according to exemplary embodiment 1.

FIGS. 3A are 3B are diagrams each showing an example of the steering wheel heater which includes heating wire 103.

Figure 3B:
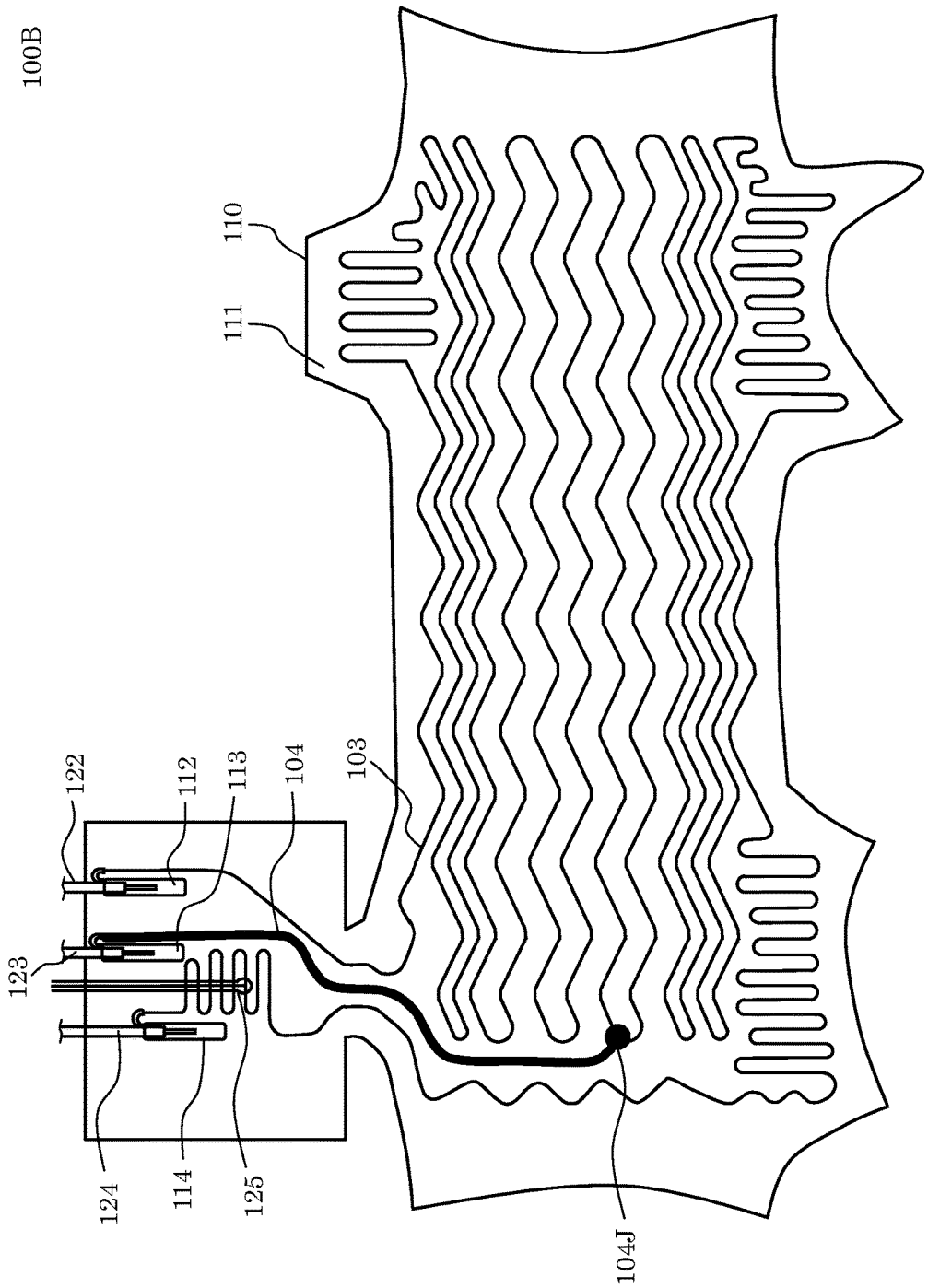
FIG. 3B is a diagram showing another example of the steering wheel heater which includes the heating wire according to exemplary embodiment 1.

Steering wheel heaters 100A and 100B respectively shown in FIG. 3A and FIG. 3B each include planar heating element 110 having flexibility, and is built in or attached to the steering wheel by being rolled around the steering wheel. Planar heating element 110 includes support 111, heating wire 103, lead-out wire 104, connecting members 112, 113, and 114, lead wires 122, 123, and 124, and thermostat 125. Connection points between the wires are indicated by 104J, P, Q, R, and S in the figure. Support 111 is formed of nonwovens.

First, an example of steering wheel heater 100A shown in FIG. 3A is now described. Heating wire 103 has a wiring pattern formed by repeatedly bending heating wire 103 in a plane. Heating wire 103 includes first heating wire 103a, second heating wire 103b, and third heating wire 103c.

Lead-out wire 104 is connected to the point along the wiring pattern of heating wire 103. Lead-out wire 104 includes first lead-out wire 104a and second lead-out wire 104b.

First heating wire 103a has one end connected to connecting member 112, and the other end connected to connection point R with first lead-out wire 104a.

Second heating wire 103b has one end connected to connection point S with second lead-out wire 104b, and the other end connected to connecting member 114.

Third heating wire 103c has one end connected to connection point P with first heating wire 103a, and the other end connected to connection point Q with second heating wire 103b. Third heating wire 103c is disposed around the outer sides of first heating wire 103a and second heating wire 103b.

First heating wire 103a, second heating wire 103b, and third heating wire 103c all have patterns each formed by repeatedly bending the heating wire in a plane in a manner to have an increased warmed area (a linear heater wire). First heating wire 103a and second heating wire 103b are connected in series. Third heating wire 103c is connected in parallel to first heating wire 103a and second heating wire 103b which are connected in series.

First lead-out wire 104a and second lead-out wire 104b are highlighted by bold lines in the figure, and connected on the points (to connection points R and S) along the wiring patterns formed of first heating wire 103a and second heating wire 103b, respectively. Lead-out wires 104a and 104b are indicated by the bold lines for the purpose of highlighting, which does not represent the actual thicknesses of lead-out wires 104a and 104b. Connection points R and S correspond to connection point 104J in FIG. 2.

First lead-out wire 104a has one end connected to connecting member 113, and the other end connected to connection point R with the other end of first heating wire 103a. Second lead-out wire 104b has one end connected to connecting member 113, and the other end connected to connection point S with the other end of second heating wire 103b.

Connecting member 112 connects the one end of first heating wire 103a and lead wire 122. Connecting member 113 connects lead wire 123 and the one ends of lead-out wires 104a and 104b. Connecting member 114 connects the other end of second heating wire 103b and lead wire 124.

Lead wire 122 and lead wire 124 are power-supply lines. Lead wire 122 is connected to one of switches 101 and 102, and lead wire 124 is connected to the other one of switches 101 switch 102. As such, power is supplied to connecting members 112 and 114 via switches 101 and 102, and contact detection circuit 106 is connected via connecting member 113 to lead-out wire 104. This increases the sensitivity of contact detection circuit 106.

While one connecting member 113 is provided in common for lead-out wires 104a and 104b in the present embodiment, a plurality of connecting members may be provided for lead-out wires 104a and 104b in one-to-one correspondence. In that case, the plurality of connecting members are connected with each other through a lead wire.

Lead wire 123 is connected via coupling capacitor 105 to contact detection circuit 106. Lead wire 123 and lead-out wire 104 are connected to contact detection circuit 106 which determines whether the steering wheel and a human hand are in contact based on the magnitude of capacitance of the wiring pattern of heating wire 103.

Thermostat switch 125 is for adjusting a temperature of the steering wheel heater.

Next, an example of steering wheel heater 100 B shown in FIG. 3B is described. The example shown in FIG. 3B is the same as the example shown in FIG. 3A, except for the following:

First, heating wire 103 forms a single-wire pattern extending from one end connected to connecting member 112 to the other end connected to connecting member 114, without a branch. Lead-out wire 104 connected to connecting member 113 is a single wire and has one connection point, that is, 104J, with the heating wire pattern. It should be noted that lead-out wire 104 is indicated by a bold line in the figure for the purpose of highlighting, which does not represent the actual thicknesses of lead-out wire 104.

The steering wheel heater thus configured connects, to the point along the wiring pattern of heating wire 103, lead-out wire 104 leading to an external contact detection circuit. With the inclusion of the steering wheel heater, a steering wheel heater device can be implemented in which a portion of the wiring pattern of heating wire 103 is disposed between switch 102 and contact detection circuit 106 which are external to steering wheel heater 100. In other words, the steering wheel heater device doubling as a device for detecting whether a human hand is in contact with the steering wheel heater, is provided with a steering wheel heater which allows the steering wheel heater device to have good sensitivity for the contact detection.

Figure 4:
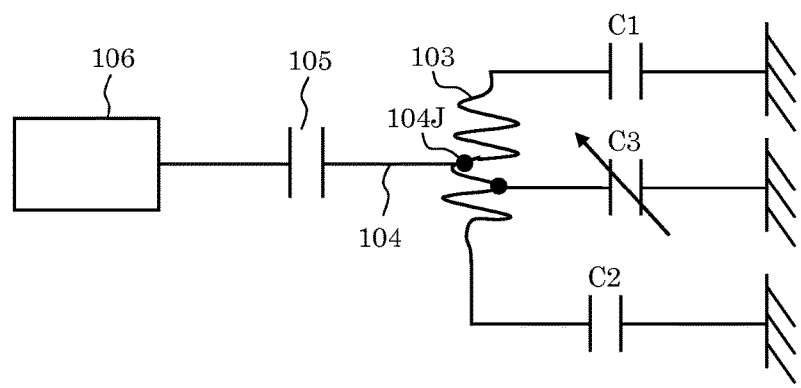
FIG. 4 is a diagram showing an equivalent circuit for contact detection by the steering wheel heater device shown in FIG. 2.

FIG. 4 is a diagram showing an equivalent circuit for contact detection by the steering wheel heater device shown in FIG. 2.

Switches 101 and 102 shown FIG. 2 are off when the steering wheel heater device detects whether the human hand is in contact with the steering wheel. When switch 101 and 102 are off, contact detection circuit 106 are connected via coupling capacitor 105 to heating wire 103, parasitic capacitance C1 and C2, and capacitance C3, as shown in FIG. 4. Here, parasitic capacitance C1 and C2 represent the parasitic capacitance of switches 101 and 102, respectively, when switches 101 and 102 are off. Electric capacitance C3 has one electrode corresponding to heating wire 103 and the other electrode corresponding to the human hand.

Capacitance C3 when the human hand is in contact with steering wheel heater 100 is greater than when the human hand is not in contact with steering wheel heater 100. Contact detection circuit 106 determines whether the human hand is in contact with steering wheel heater 100, based on the magnitude of capacitance C3.

In the example shown in FIG. 4, lead-out wire 104 is connected approximately halfway through the total length of the wiring pattern of heating wire 103. Contact detection circuit 106 is connected in series to parasitic capacitance C1 and an approximately half of the heating wire pattern via coupling capacitor 105 and lead-out wire 104. Likewise, contact detection circuit 106 is connected in series to parasitic capacitance C2 and an approximately remaining half of the heating wire pattern via coupling capacitor 105 and lead-out wire 104. Meanwhile, contact detection circuit 106 is connected to capacitance C3 via coupling capacitor 105 and lead-out wire 104.

In other words, the approximately half of the heating wire pattern is disposed between lead-out wire 104 and parasitic capacitance C1. The approximately remaining half of the heating wire pattern is disposed between lead-out wire 104 and parasitic capacitance C2. Lead-out wire 104 and capacitance C3 may be connected directly.

Since the heating wire pattern is formed by repeatedly bending, heating wire 103, the approximately half and the approximately remaining half of the heating wire pattern not only have resistance but also serve as inductors. Thus, an inductance component obtained from the approximately half and an inductance component obtained from the approximately remaining half of the heating wire pattern, when seen from lead-out wire 104, are connected in series to parasitic capacitance C1 and C2, respectively. Thus, the impedance obtained by the serial connection is a small reactance component, which has reduced effects on capacitance C3 between the human hand and the heater wire.

While FIG. 4 shows the example where connection point 104J between lead-out wire 104 and the wiring pattern of heating wire 103 is approximately halfway through the total length of the heating wire pattern, the present disclosure is not limited thereto.

Figure 12:
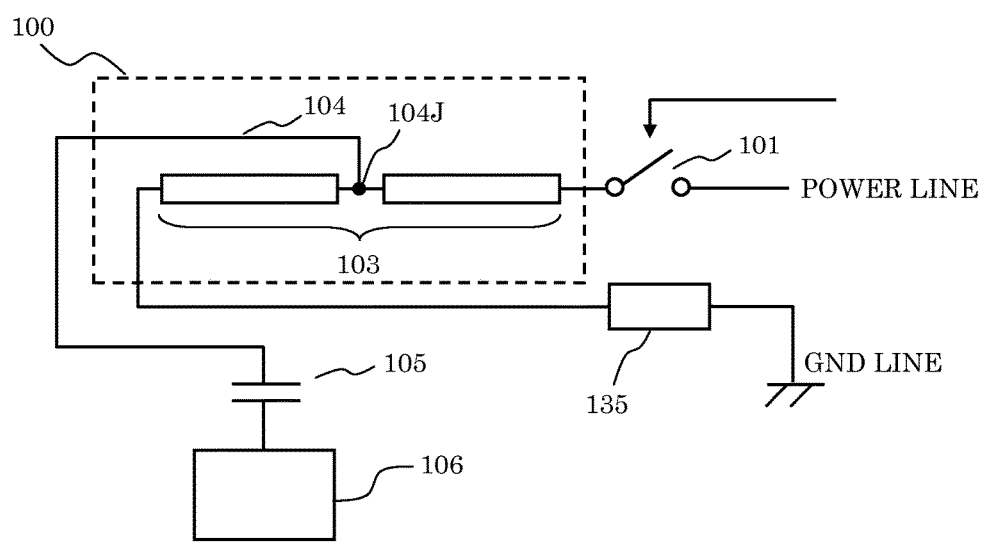
FIG. 12 is a diagram showing a steering wheel heater device according to variation 2 of exemplary embodiment 2.

For example, connection point 104J between lead-out wire 104 and the heating wire pattern may be a point dividing the total length of the heating wire pattern to a ratio of N:1. N is a real number greater than or equal to 1 and less than or equal to 2, for example. N corresponds to a portion of the heating wire pattern on the GND line side in FIG. 2 in the present embodiment and FIG. 10 below. In FIG. 12 below, N varies depending on an inductance value of inductive element 135.

Alternatively, connection point 104J between lead-out wire 104 and the heating wire pattern may be a position dividing the impedance due to the heating wire pattern and the parasitic capacitance to the ratio of N:1.

Variation of Exemplary Embodiment 1

Figure 5:
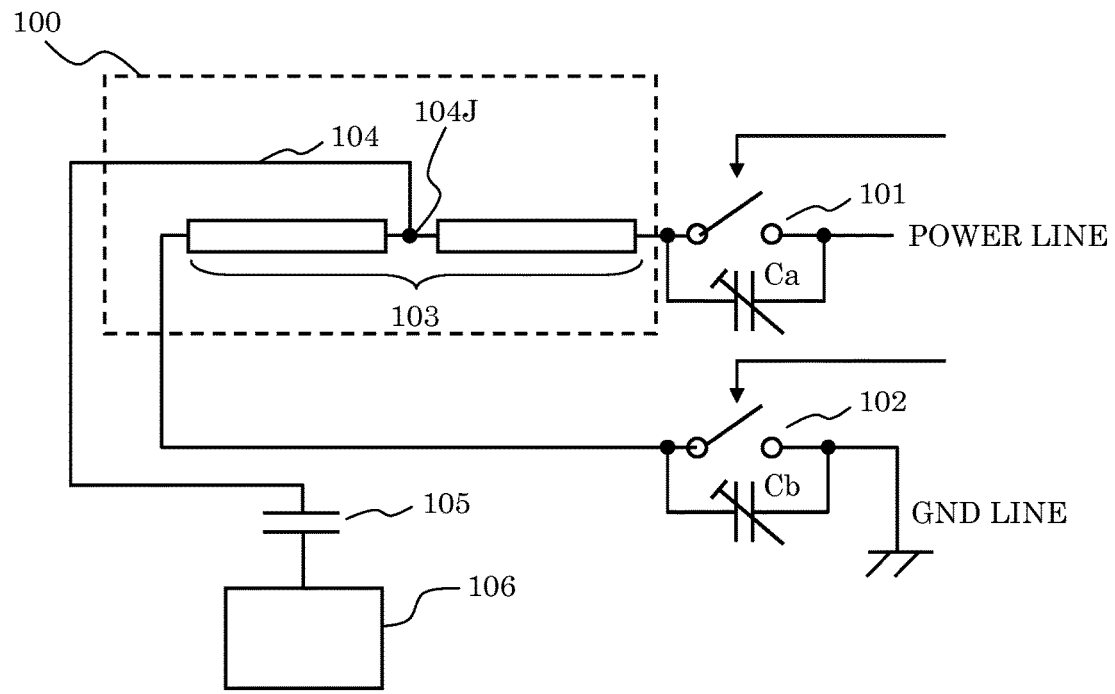
FIG. 5 is a block diagram of a configuration of a steering wheel heater device according to a variation of exemplary embodiment 1.

FIG. 5 is a block diagram of another configuration example of the steering wheel heater device according to exemplary embodiment 1. The configuration shown in FIG. 5 is the same as that shown in FIG. 2, except that adjusted capacitors Ca and Cb are added.

Adjusted capacitor Ca is connected in parallel to switch 101. Adjusted capacitor Cb is connected in parallel to switch 102. Adjusted capacitors Ca and Cb are capacitors whose capacitance values are semi-fixedly adjustable.

While contact detection circuit 106 is inactive (i.e., while the steering wheel heater device is heating when switches 101 and 102 are on), adjusted capacitors Ca and Cb are being shorted in response to switches 101 and 102 turning on, and thus have no effects on the heating of the steering wheel heater device. In contrast, when switches 101 and 102 are off, adjusted capacitors Ca and Cb are connected in parallel to the parasitic capacitance of switch 101 and the parasitic capacitance of switch 102, respectively, and thus perform its functions.

Figure 6:
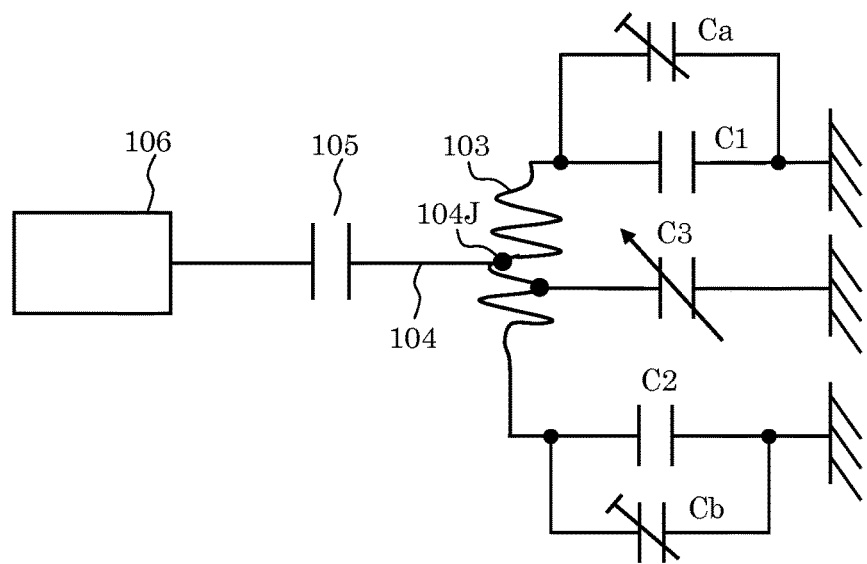
FIG. 6 is a diagram showing an equivalent circuit for contact detection by the steering wheel heater device shown in FIG. 5.

FIG. 6 is a diagram showing an equivalent circuit for contact detection by the steering wheel heater device shown in FIG. 5.

Adjusted capacitors Ca and Cb, when contact detection circuit 106 is active (i.e., when switch 101 and switch 102 are off) are connected in parallel to respective parasitic capacitance C1 and C2 of switches 101 and 102. In this configuration, the sensitivity of contact detection circuit 106 can optimally be enhanced by adjusting the capacitance values of adjusted capacitors Ca and Cb.

Specifically, (i) an L (inductance) component of a portion of the heating wire pattern from lead-out wire 104 (104a and 104b) and the parasitic capacitance of a switch form a series-resonant circuit. Additionally, (ii) an L component of the remaining portion of the heating wire pattern from the lead-out wire and the parasitic capacitance of another switch form a series-resonant circuit. Since (i) and (ii) are connected in parallel, they form a parallel LC resonant circuit if one of (i) and (ii) is inductive and the other be capacitive.

If the operating frequency of contact detection circuit 106 substantially coincides with the resonant frequency of the parallel resonant circuit, signal flow from contact detection circuit 106 is hindered, ending up reducing the sensitivity of contact detection circuit 106.

Accordingly, the capacitance values of adjusted capacitors Ca and Cb are adjusted, thereby preventing the resonance of the parallel LC resonant circuit. As a result, the sensitivity of contact detection circuit 106 is optimally enhanced. For example, the capacitance values of adjusted capacitors Ca and Cb may be adjusted such that the operating frequency of contact detection circuit 106 and the resonant frequency of the parallel resonant circuit do not coincide. Alternatively, Ca and Cb may be adjusted such that the parallel resonant circuit does not resonate. The capacitance values of adjusted capacitors Ca and Cb may be adjusted as the factory default settings.

It should be noted that adjusted capacitors Ca and Cb in FIG. 6 may not be variable capacitors whose capacitance is adjustable, and may be capacitors whose capacitance is fixed. In this case, capacitors are employed which have suitable capacitance for the inductance of heating wire 103 and the parasitic capacitance of switches 101 and 102.

As described above, preferably, the steering wheel heater device includes adjusted capacitors Ca and Cb. This enables the connection point between lead-out wire 104a and the heating wire pattern and the connection point between lead-out wire 104b and the heating wire pattern in FIG. 3A (and the connection point between lead-out wire 104 and the heating wire pattern in FIG. 3B) to be arbitrary determined, insofar as they are present somewhere on the heating wire pattern. This also achieves optimal enhancement in sensitivity of contact detection circuit 106. In other words, this improves flexibility in designing the steering wheel heater and contact detection circuit 106.

Figure 7:
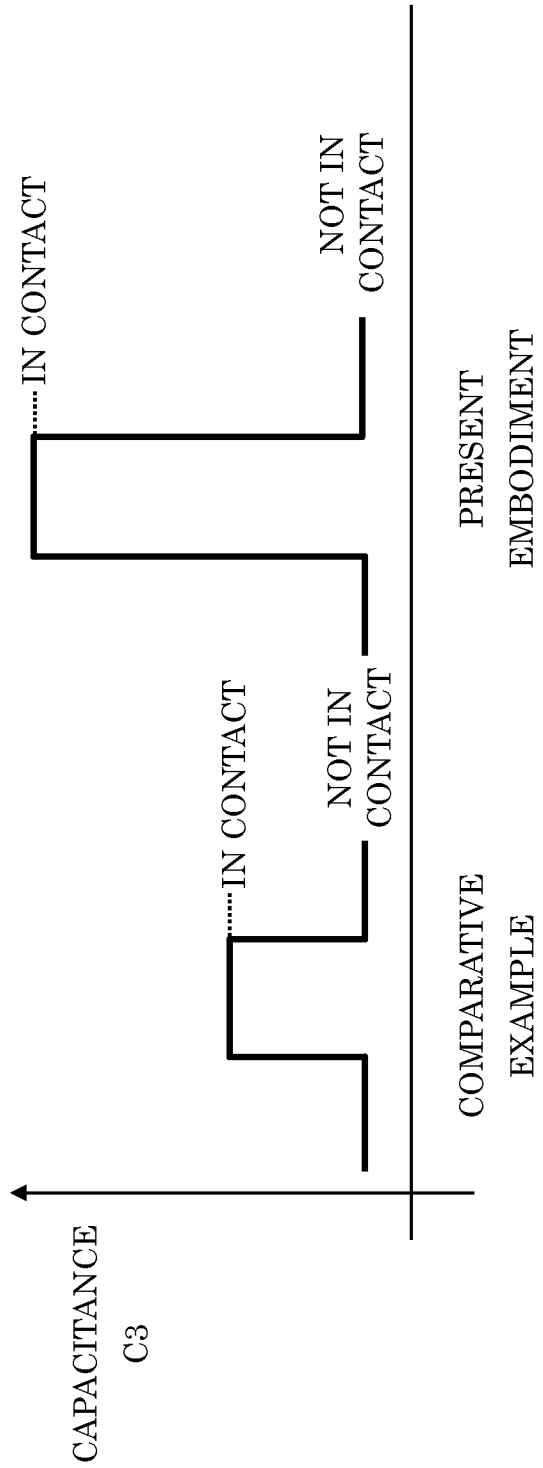
FIG. 7 is a diagram showing an amount of changes in capacitance according to exemplary embodiment 1 versus a comparative example.
Figure 18:
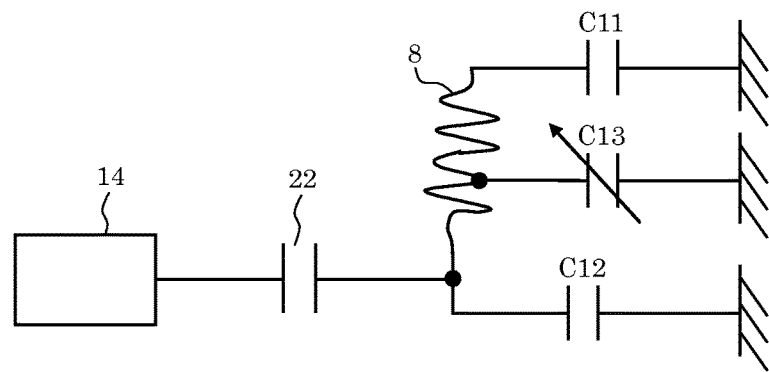
FIG. 18 is a diagram showing an equivalent circuit for seating detection by the vehicle seat apparatus of FIG. 17.

FIG. 7 is a diagram showing an amount of changes in capacitance according to exemplary embodiment 1 (including the variation thereof) versus a comparative example (a conventional design). For example, the configuration shown in FIG. 18 is of the conventional design. The configurations shown in FIG. 4 or FIG. 6 are of the present embodiment. The magnitude of capacitance detected is indicated on the vertical axis. According to the steering wheel heater device of the present embodiment, as compared to the conventional, a difference in capacitance can be increased between when the human hand is in contact with the steering wheel and when the human hand is not in contact with the steering wheel.

Figure 8:
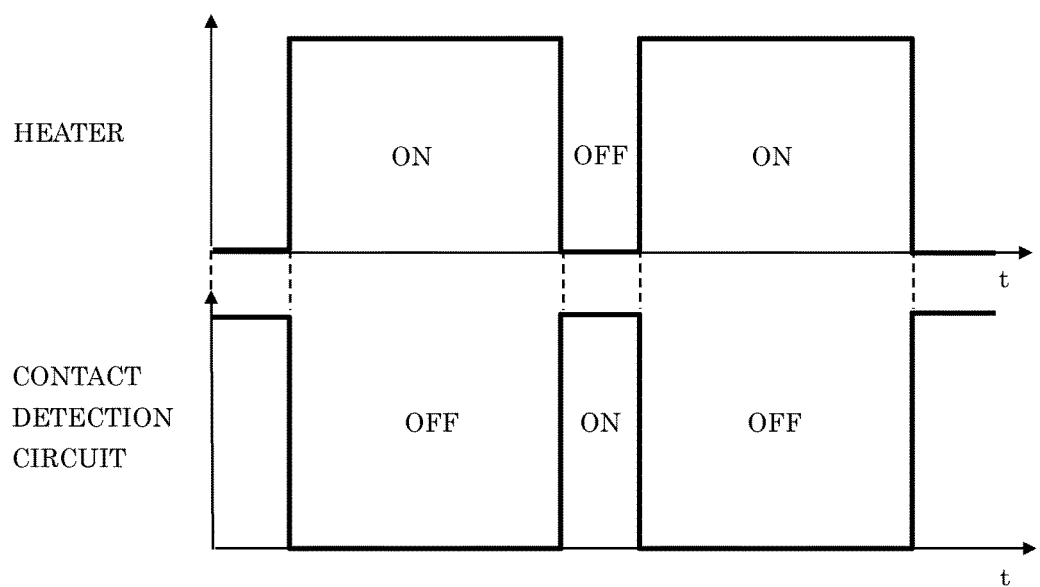
FIG. 8 is a timing chart depicting heater operation and contact determination operation according to exemplary embodiment 1.

FIG. 8 is a diagram showing an example of a timing chart depicting heater operation and operation of contact detection circuit 106 according to the present embodiment. ON (activation) and OFF (deactivation) of the heater operation of the steering wheel heater device, and ON (activation) and OFF (deactivation) of the contact detecting operation of contact detection circuit 106 are indicated on the vertical axis, and passage of time (t) is indicated on the horizontal axis. In this example, the heater operation and the operation of contact detection circuit 106 are switched in an alternative way, each performing intermittent operation. Contact of the human hand with the steering wheel can be detected at a speed to an extent the switching is hardly noticeable by the person, while warming the steering wheel.

Figure 9:
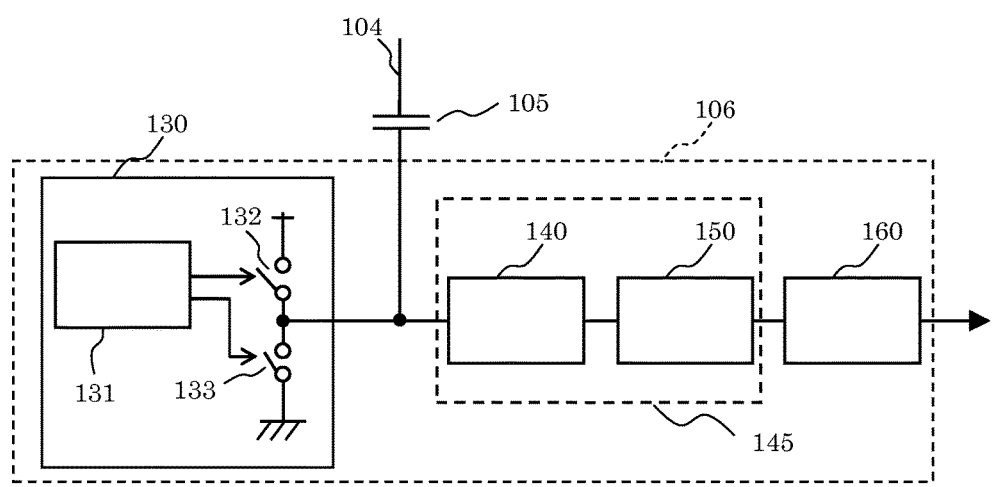
FIG. 9 is a diagram of a configuration example of a contact detection circuit according to exemplary embodiment 1.

FIG. 9 is a diagram of a configuration example of contact detection circuit 106 according to the present embodiment. Contact detection circuit 106 includes electrical charge injector 130, smoothing circuit 140, analog-to-digital (A/D) converter 150, and determinator 160.

Electrical charge injector 130 includes pulse generator 131, and switches 132 and 133. When switches 101 and 102 are off, electrical charge injector 130 injects electrical charge into the heating wire pattern via lead-out wire 104 and coupling capacitor 105. Pulse generator 131 produces a periodic pulse. Switch 132 cycles on and off according to the periodic pulse. Switch 133 is off when switch 132 is on, and is on when switch 132 is off.

Smoothing circuit 140 smoothes a signal level of lead-out wire 104.

A/D converter 150 transforms the smoothed signal level into a digital value.

Smoothing circuit 140 and A/D converter 150 form detector 145.

Determinator 160 compares the digital value from A/D converter 150 with threshold, and determines that the human hand is not in contact with the steering wheel if the digital value is less than the threshold (if capacitance C3 is small), whereas determines that the hand is in contact with the steering wheel if the digital value exceeds the threshold (if capacitance C3 is large). Additionally, determinator 160 determines (estimates) a distance between the steering wheel and the human hand based on a difference between the digital value and the threshold, if the hand is not in contact with the steering wheel.

Such a configuration allows contact detection circuit 106, which determines whether the human hand is in contact with the steering wheel, to be configured in a simple manner.

It should be noted that electrical charge injector 130 may repeatedly inject electrical charge into the wiring pattern of heating wire 103. By repeatedly injecting electrical charge into the wiring pattern of heating wire 103, determination as to whether the human hand is in contact with the steering wheel can repeatedly be made, thereby improving accuracy of the contact determination.

It should be noted that a part or the whole of contact detection circuit 106 may be implemented with a microcomputer or one LSI (Large Scale Integration) chip.

As described above, the steering wheel heater device according to the present embodiment has the portion of the heating wire pattern disposed between the parasitic capacitance of the switch and the contact detection circuit, as shown in FIGS. 4 and 6. This prevents contact detection circuit 106 and parasitic capacitance C1 and C2 of switches 101 and switch 102 from being directly coupled with each other via lead-out wire 104 when switches 101 and 102 are off. Consequently, the effects of parasitic capacitance C1 and C2 of switches 101 and 102 on capacitance C3 between the heating wire pattern and the human hand can be reduced or eliminated. As a result, the sensitivity of contact detection circuit 106 improves. Moreover, a fact that the steering wheel heater device includes adjusted capacitors Ca and Cb not only optimally enhances the sensitivity of contact detection circuit 106, but also improves the flexibility in designing the steering wheel heater and contact detection circuit 106.

It should be noted that various modifications to the steering wheel heater device are possible.

Exemplary Embodiment 2

Figure 10:
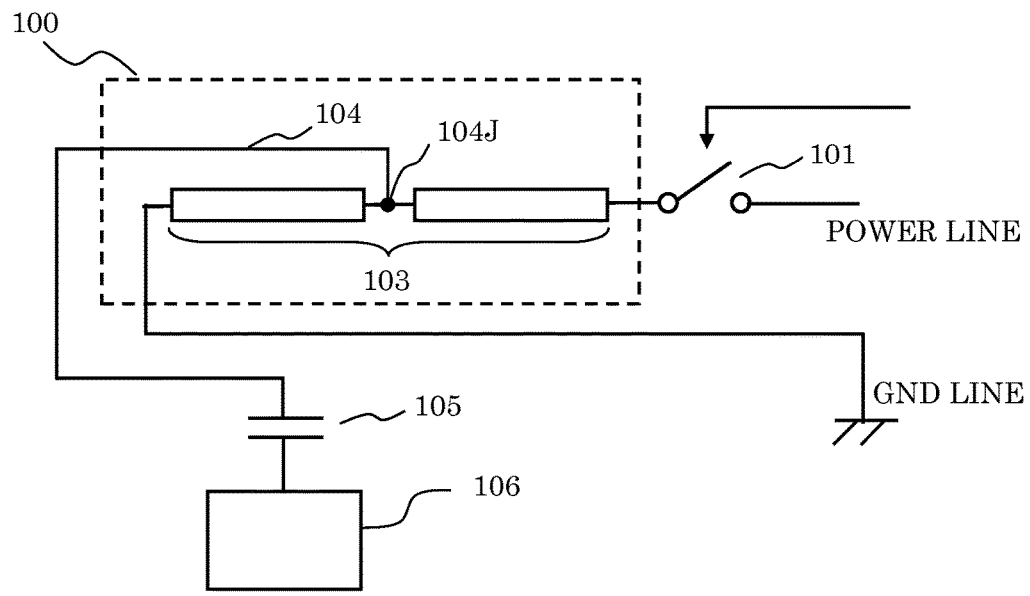
FIG. 10 is a diagram of a configuration example of a steering wheel heater device according to exemplary embodiment 2.
Figure 11:
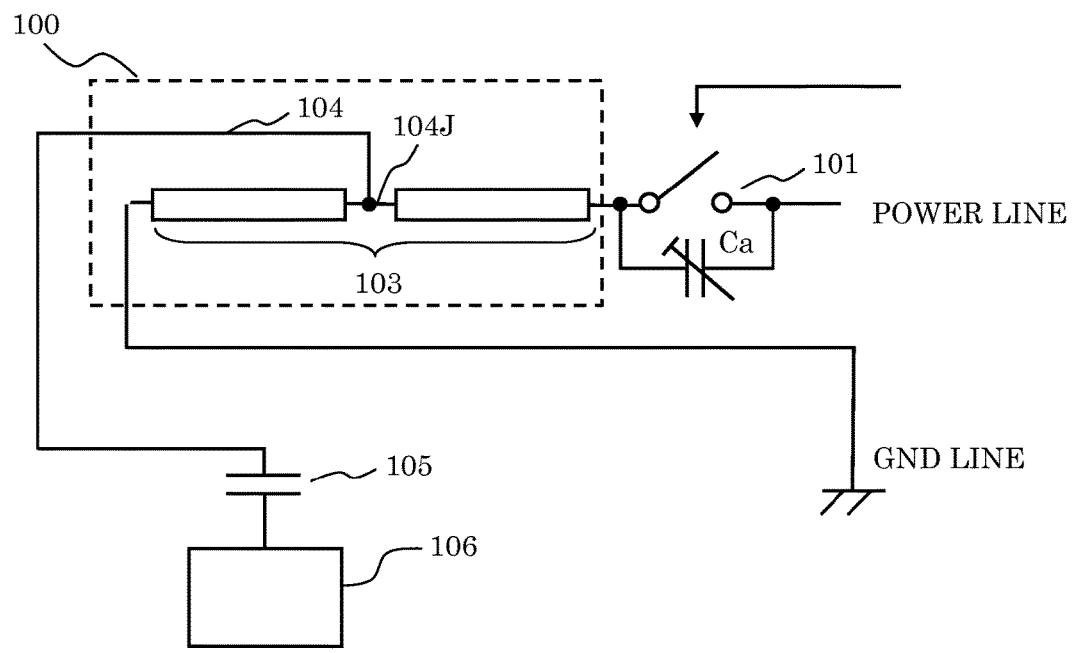
FIG. 11 is a diagram showing a steering wheel heater device according to variation 1 of exemplary embodiment 2.

Hereinafter, a steering wheel heater device according to exemplary embodiment 2 will be described, with reference to FIGS. 10 through 12. FIGS. 10 through 12 are diagrams showing a steering wheel heater device according to exemplary embodiment 2 and variations thereof.

Exemplary embodiment 2 is significantly different from exemplary embodiment 1 in that switch 102 is absent and one end of heating wire 103 is connected to GND, as shown in FIG. 10.

An equivalent circuit when switch 101 is off, as shown in FIG. 10, has C2 in FIG. 4 having both electrodes shorted.

With this configuration, when contact detection circuit 106 is active, an approximately half (or a portion) of the wiring pattern of heating wire 103 is disposed between contact detection circuit 106 and GND. Since switch 102 is absent, parasitic capacitance C2 has no effect on the detection of capacitance C3. In other words, contact detection circuit 106 is connected to GND via the resistance and inductance of the approximately half (or the portion) of the heating wire pattern, and thus the sensitivity of contact detection circuit 106 for detecting capacitance C3 improves as compared with the conventional technique.

The wiring pattern of heating wire 103 serves as an inductor, as described above. Thus, the addition of an inductive element is unnecessary if the portion of the heating wire pattern yields impedance sufficient for reducing or eliminating the effects of the parasitic capacitance on capacitance C3 between the human hand and the steering wheel. In other words, the sensitivity of contact detection can be improved, while contact detection circuit 106 remained simple.

Variation 1 of Exemplary Embodiment 2

FIG. 11 is a block diagram of configuration of steering wheel heater device according to variation 1 of exemplary embodiment 2.

Variation 1 of exemplary embodiment 2 is the same as exemplary embodiment 2 shown in FIG. 10, except that adjusted capacitor Ca is added. An equivalent circuit when switch 101 is off as shown in FIG. 11 has C2 in FIG. 6 having both electrodes shorted.

With this configuration, the capacitance value of adjusted capacitor Ca is adjustable, as described in the variation of exemplary embodiment 1. This can further optimally enhance the sensitivity of contact detection circuit 106. This can also improve flexibility in designing the steering wheel heater and contact detection circuit 106.

Variation 2 of Exemplary Embodiment 2

FIG. 12 is a block diagram of configuration of a steering wheel heater device according to variation 2 of exemplary embodiment 2.

Variation 2 of exemplary embodiment 2 is the same as exemplary embodiment 2 shown in FIG. 10, except that inductive element 135 is disposed between GND and one end of heating wire 103.

In variation 2, a portion of the wiring pattern of heating wire 103 and inductive element 135, which is an external inductor, prevent contact detection circuit 106 and GND from being directly coupled. Inductive element 135 may be added in such a manner if the portion of the wiring pattern of heating wire 103 does not yield impedance sufficient for reducing or eliminating the effects of parasitic capacitance on capacitance between the human hand and the steering wheel.

Exemplary Embodiment 3

In exemplary embodiments 1 and 2, and variations thereof, the configurations of the steering wheel heater device have been shown, assuming that steering wheel heater 100 is provided at an arbitrary location on a steering wheel. In the following, in exemplary embodiment 3, a configuration of a steering wheel heater device will be described, with reference to FIGS. 13 through 16, in which a plurality of steering wheel heaters are disposed on the steering wheel and concurrently controlled.

Figure 13:
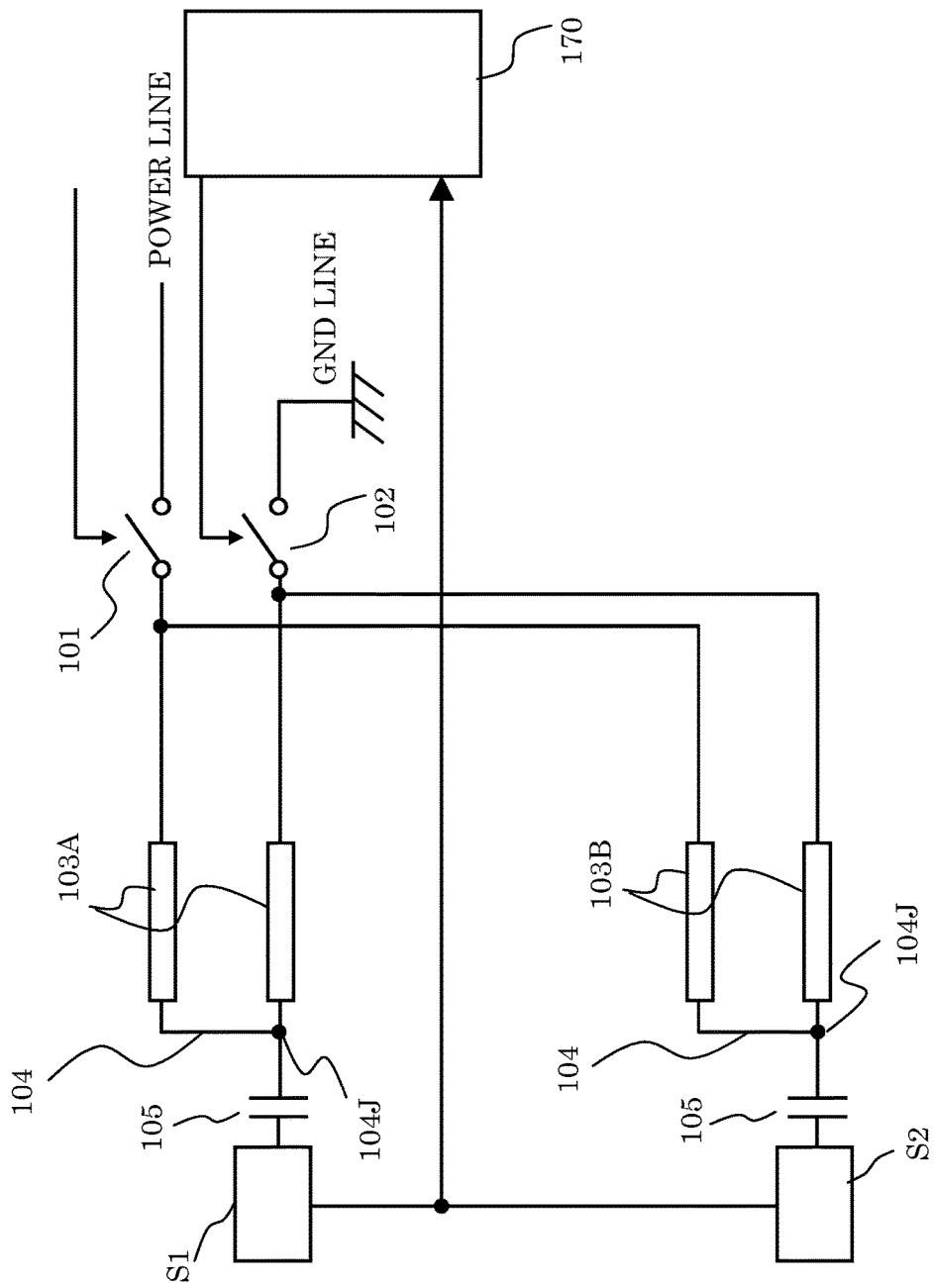
FIG. 13 is a diagram of a configuration example of a steering wheel heater device according to exemplary embodiment 3.

FIG. 13 is a diagram of a configuration example of a steering wheel heater device according to exemplary embodiment 3. The steering wheel heater device according to the present embodiment includes heater wire 103A (heating wire 103 of a first steering wheel heater), heater wire 103B (heating wire 103 of a second steering wheel heater), contact detection circuit S1 connected to heater wire 103A, contact detection circuit S2 connected to heater wire 103B, switch 101 connected to one end of heater wire 103A and one end of heater wire 103B, switch 102 connected to the other end of heater wire 103A and the other end of heater wire 103B, and control circuit 170 which controls contact detection circuits S1 and S2.

As with exemplary embodiment 1, heater wires 103A and 103B each have connection point 104J with lead-out wire 104 at a point along its wiring pattern. Specifically, when contact detection circuits S1 and S2 are active, portions of the wiring patterns of heater wires 103A and 103B, when seen from contact detection circuits S1 and S2, are disposed between switch 102 and contact detection circuit S1 and between switch 102 and contact detection circuit S2, respectively. In other words, a steering wheel heater device can be provided which can reduce or eliminate effects of parasitic capacitance C2 on the detection of capacitance C3 and has good sensitivity for the contact detection.

While a plurality of heater wires and a plurality of contact detection circuits are disposed in the present embodiment, a power line, switch 101, a GND line, and switch 102 are shared between heater wires 103A and 103B, as shown in FIG. 13.

Figure 14:
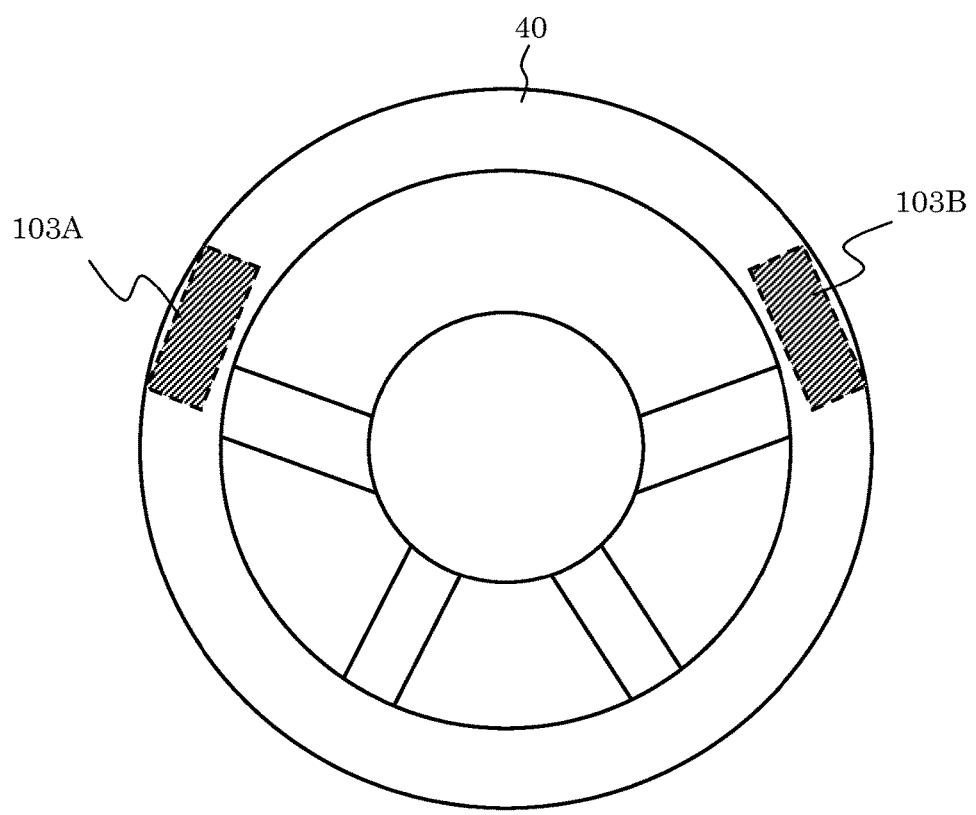
FIG. 14 is a diagram showing an example of a steering wheel which includes the steering wheel heater devices according to exemplary embodiment 3.

It is desirable that heater wires 103A and 103B are disposed on the left and right of steering wheel 40 as placed in a normal position, as shown in FIG. 14. With this configuration, whether the right hand or the left hand is in contact with the steering wheel can be detected in an efficient way, contributing to the efficiency as a whole of the steering wheel heater device doubling as a device for detecting contact of a human hand with the steering wheel.

Variation 1 of Exemplary Embodiment 3

Figure 15:
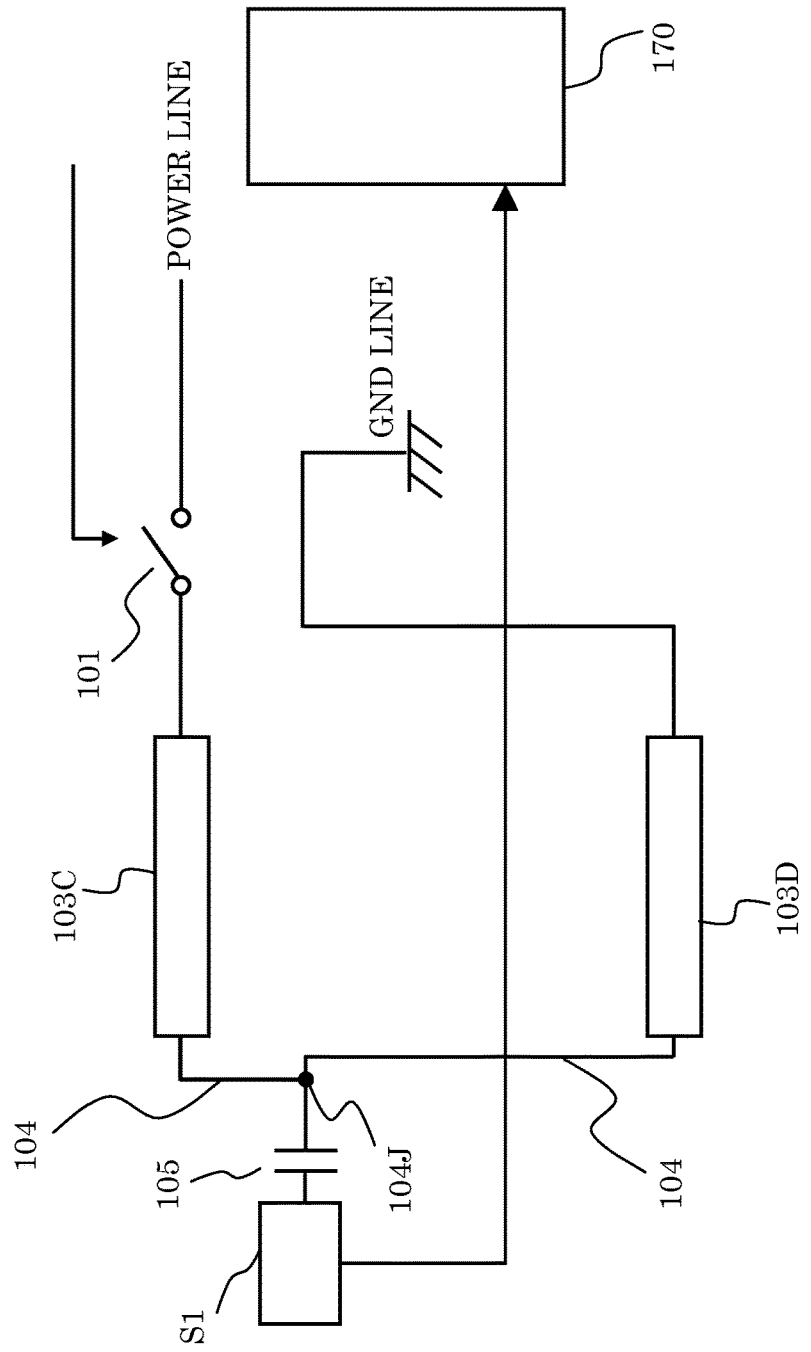
FIG. 15 is a diagram showing a steering wheel heater device according to variation 1 of exemplary embodiment 3.

FIG. 15 is a block diagram of configuration of a steering wheel heater device according to variation 1 of exemplary embodiment 3.

Variation 1 of exemplary embodiment 3 is the same as exemplary embodiment 3 shown in FIG. 13, except that contact detection circuit S2 is absent, and a string of heating wire 103 is divided into heater wire 103C and heater wire 103D. Moreover, as with exemplary embodiment 2, switch 102 is absent and one end of heater wire 103D is connected to GND, which is different from exemplary embodiment 3.

In variation 1 of exemplary embodiment 3, heater wires 103C and 103D constitute the string of heating wire 103, and have connection point 104J, along its wiring patterns, with lead-out wire 104, and are connected to contact detection circuit S1. Heater wires 103C and 103D in FIG. 15 are disposed on the left and right of steering wheel 40, as with heater wires 103A and 103B in FIG. 14.

With this configuration, contact detection circuit S1, a power line, switch 101, and a GND line can be shared between the plurality of heater wires disposed on the steering wheel, thereby reducing the size and power consumption of the steering wheel heater device, as compared to including two of the steering wheel heater devices according to exemplary embodiment 2.

Since switch 102 is absent as with exemplary embodiment 2, parasitic capacitance C2 has no effect on the detection of capacitance C3. Since the portion of the heating wire pattern is disposed between contact detection circuit S1 and GND when contact detection circuit S1 is active, the detection sensitivity of contact detection circuit S1 can be improved, as compared to the conventional technique. The heating wire pattern serves as an inductor, and thus the sensitivity of contact detection circuit S1 for the contact detection can be improved while contact detection circuit S1 remained simple, without addition of an inductive element.

Variation 2 of Exemplary Embodiment 3

Figure 16:
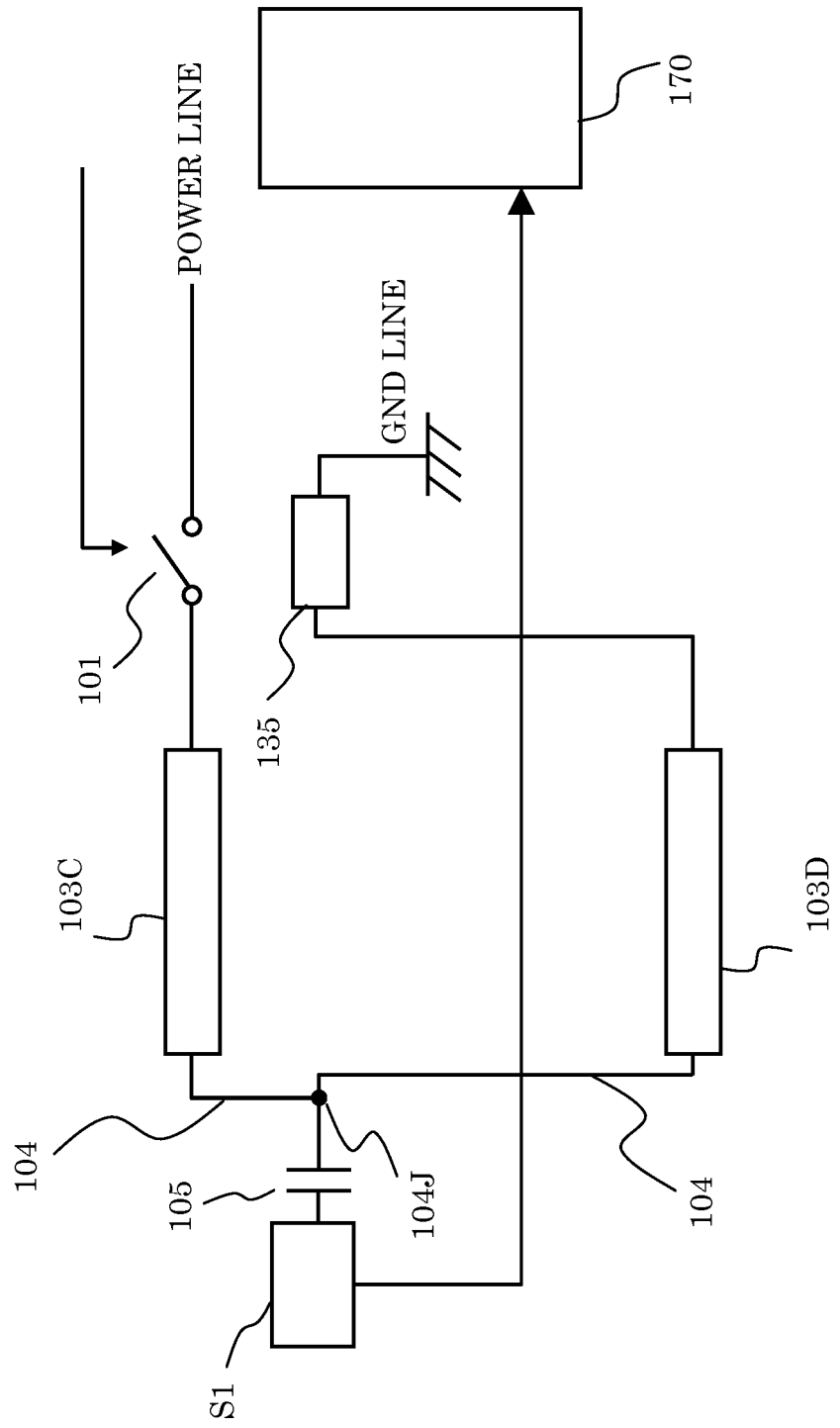
FIG. 16 is a diagram showing a steering wheel heater device according to variation 2 of exemplary embodiment 3.
Figure 17:
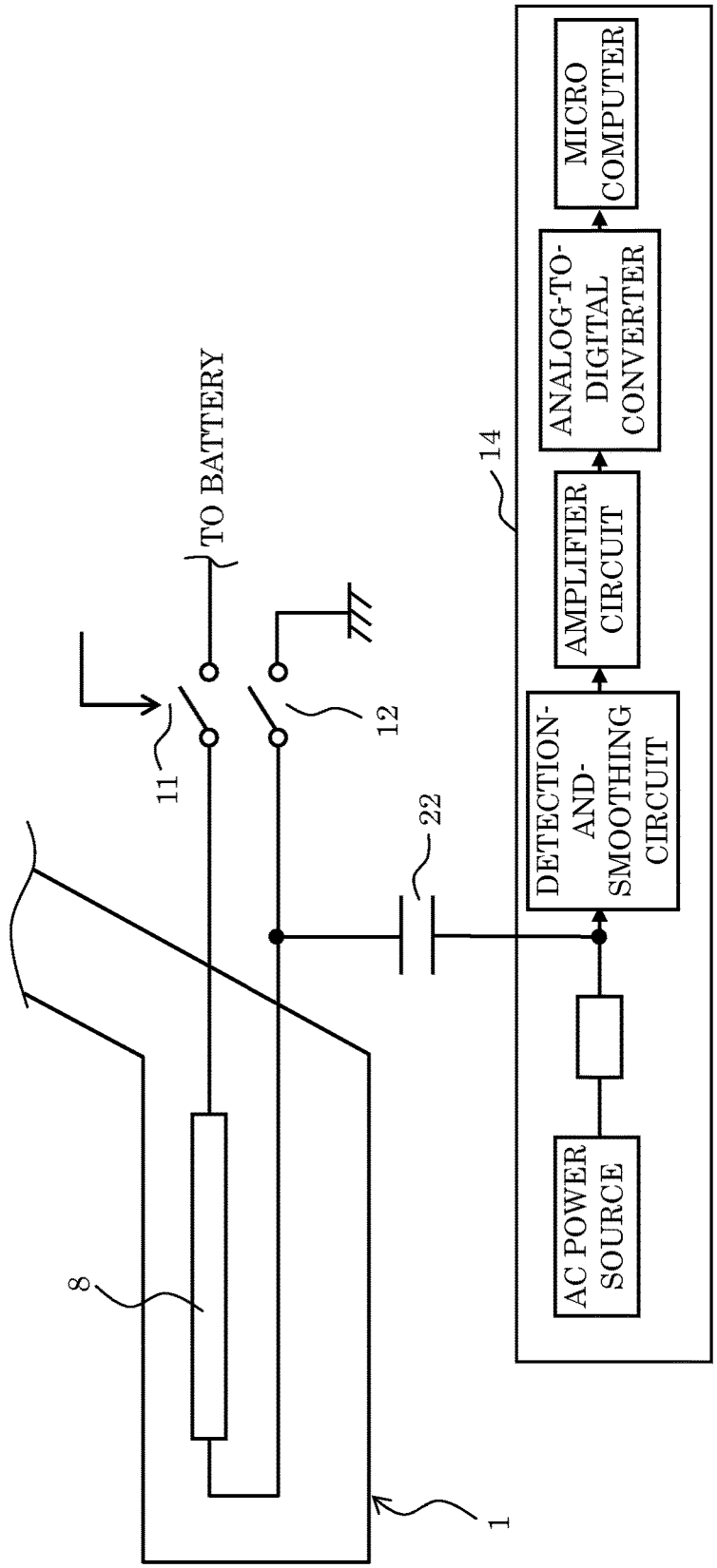
FIG. 17 is a schematic vertical sectional view of a vehicle seat apparatus in a conventional technique.

FIG. 16 is a block diagram of configuration of a steering wheel heater device according to variation 2 of exemplary embodiment 3.

Variation 2 of exemplary embodiment 3 is the same as exemplary embodiment 3 shown in FIG. 15, except that inductive element 135 is attached to a GND line. This can compensate for the case where heater wire 103D does not yield impedance sufficient for reducing or eliminating the effects of parasitic capacitance on capacitance between a human hand and a steering wheel.

While contact detection circuits 106, S1, and S2 are connected to lead-out wire 104 via coupling capacitor 105 in the exemplary embodiments and variations thereof described above, a diode may be employed in place of coupling capacitor 105. In this case the diode has an anode connected to contact detection circuits 106, S1, and S2, and a cathode connected to lead-out wire 104. Alternatively, coupling capacitor 105 may be eliminated and contact detection circuits 106, S1, and S2 may directly be connected to lead-out wire 104.

While exemplary embodiments 1 through 3 and variations thereof have been described above as an illustration of the technique disclosed in the present application, the technology of the present disclosure is not limited thereto. Various modifications to the exemplary embodiments that may be conceived by a person skilled in the art or combinations of the components of different exemplary embodiments are intended to be included within the scope of the technology of the present disclosure, without departing from the spirit of the technology of the present disclosure.

INDUSTRIAL APPLICABILITY

The present disclosure is applicable as a steering wheel heater device to be included in a steering wheel of a vehicle or the like and for detecting whether a human hand is in contact with the steering wheel.

REFERENCE MARKS IN THE DRAWINGS 11, 12 seat-heater release switch
30, 40 steering wheel
100, 100A, 100B steering wheel heater
101, 102, 132, 133 switch
103, 103A, 103B, 103C, 103D heating wire (heater wire)
103a first heating wire
103b second heating wire
103c third heating wire
104, 104a, 104b lead-out wire
104J, P, Q, R, S connection point
22, 105 coupling capacitor
106, S1, S2 contact detection circuit
110 planar heating element
111 support
112, 113, 114 connecting member
122, 123, 124 lead wire
125 thermostat
130 electrical charge injector
131 pulse generator
135 inductive element
140 smoothing circuit
145 detector
150 analog-to digital converter
160 determinator
170 control circuit
C1, C2, C11, C12 parasitic capacitance
C3, C13 capacitance
Ca, Cb adjusted capacitor

The invention claimed is:

1. A steering wheel heater comprising:
a heating wire;
a first connecting member connected to a first end of the heating wire, the first connecting member being externally connected;
a second connecting member connected to a second end of the heating wire, the second connecting member being externally connected;
a lead-out wire connected to a portion between the first end and the second end which is a point along a wiring pattern formed of the heating wire; and
a third connecting member connected to the lead-out wire, the third connecting member being externally connected, wherein
the first connecting member or the second connecting member is connected to an external power line through which a direct-current passes, the third connecting member being connected to an external signal line.

2. The steering wheel heater according to claim 1, wherein the wiring pattern includes a wiring pattern formed by repeatedly bending the heating wire in a plane, and forms a planar heating element having flexibility.

3. The steering wheel heater according to claim 1, wherein the heating wire includes a first heating wire having a first end and a second end, and a second heating wire having a first end and a second end, and
the lead-out wire includes a first lead-out wire connected to the second end of the first heating wire and a second lead-out wire connected to the first end of the second heating wire.

4. The steering wheel heater according to claim 3, wherein the first connecting member is connected to the first end of the first heating wire, and
the second connecting member is connected to the second end of the second heating wire.

5. The steering wheel heater according to claim 3, wherein a plurality of the third connecting members are provided for the first lead-out wire and the second lead-out wire in one-to-one correspondence and connected with each other through a lead wire.

6. The steering wheel heater according to claim 1, wherein the wiring pattern formed of the heating wire is a series wiring pattern which has no branch between the first end and the second end.

7. A steering wheel comprising:
a first heating wire;

a second heating wire;
a power line to which a first end of the first heating wire and a first end of the second heating wire are connected in common;
a ground line to which a second end of the first heating wire and a second end of the second heating wire are connected in common;
a first lead-out wire connected to a point along a wiring pattern formed of the first heating wire;
a second lead-out wire connected to a point along a wiring pattern formed of the second heating wire;
a first contact detection circuit electrically connected to the first wiring pattern through the first lead-out wire; and
a second contact detection circuit electrically connected to the second wiring pattern through the second lead-out wire, wherein
a portion of the first wiring pattern formed of the first heating wire is connected in series between the ground line and the first contact detection circuit,
a portion of the second wiring pattern formed of the second heating wire is connected in series between the ground line and the second contact detection circuit, and
the first wiring pattern formed of the first heating wire and the second wiring pattern formed of the second heating wire are included on left and right, respectively, of the steering wheel.

8. The steering wheel according to claim 7, further comprising
a first switch connected to the power line, wherein
the power line is connected via the first switch to the first end of the first heating wire and the first end of the second heating wire.

9. The steering wheel according to claim 8, further comprising
a second switch connected to the ground line, wherein
the ground line is connected via the second switch to the second end of the first heating wire and the second end of the second heating wire.

* * * * *